UNITED STATES PATENT OFFICE.

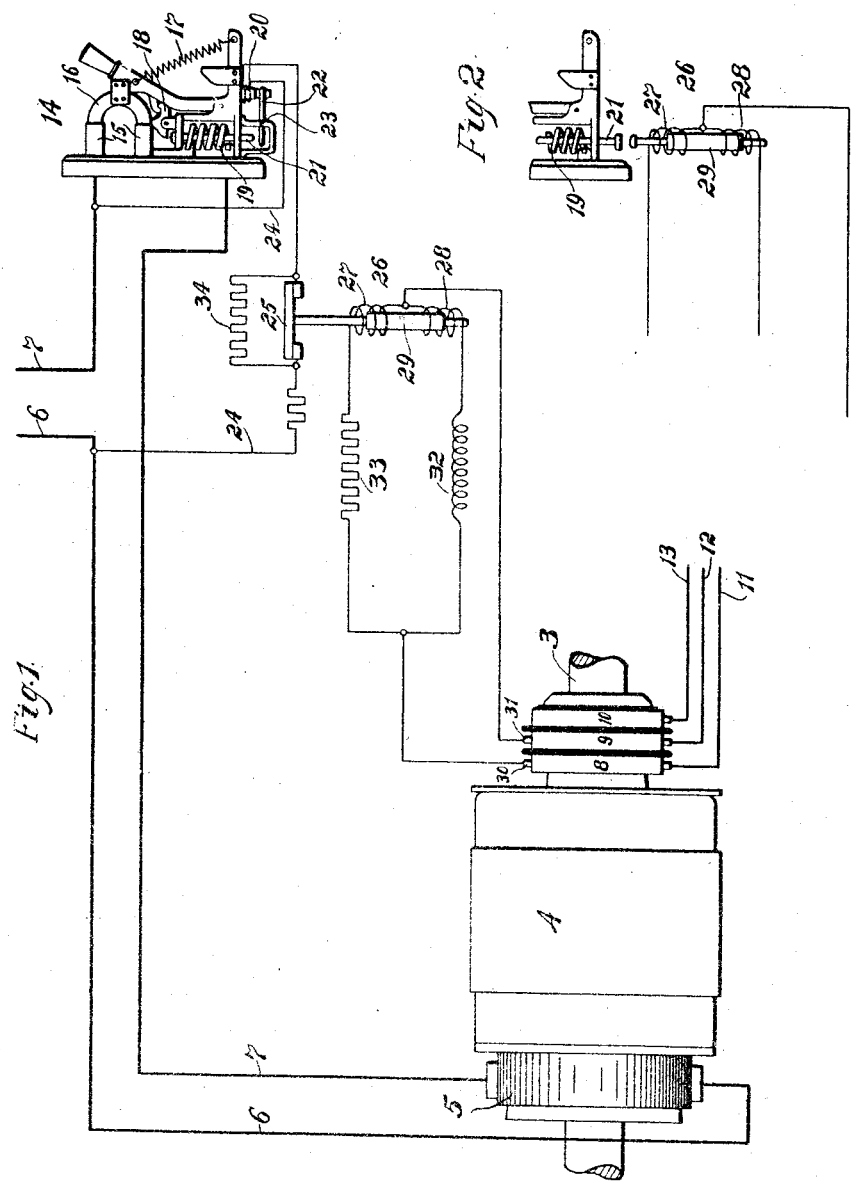

LOUIS C. MARBURG, OF NORWOOD, OHIO, ASSIGNOR TO THE BULLOCK ELECTRIC MANUFACTURING COMPANY, A CORPORATION OF OHIO.

SPEED-LIMITING DEVICE.

1,055,931. Specification of Letters Patent. Patented Mar. 11, 1913.

Application filed March 9, 1905. Serial No. 249,186.

*To all whom it may concern:*

Be it known that I, LOUIS C. MARBURG, a citizen of the United States, residing at Norwood, in the county of Hamilton and State of Ohio, have invented certain new and useful Improvements in Speed-Limiting Devices, of which the following is a full, clear, and exact specification.

My invention relates to speed limiting devices as applied to rotating elements, and more particularly as applied to rotating members of dynamo electric machines of the rotary converter or motor generator type.

The invention is capable of use in connection with various types of machines, but is especially applicable to rotary converters, which as ordinarily employed in systems of current distribution, receive alternating current from a source of supply and transform said alternating current into direct current, the latter being fed into a direct current distributing system. Under certain abnormal conditions of field strength, load, and voltage, a compound-wound rotary converter will run as an inverted rotary fed from the direct current mains, and will speed up to a dangerous extent. It is desirable under such circumstances to employ means for automatically cutting off the direct current source of supply from the machine controlling the current supplied to said machine, when its speed rises above a predetermined value.

As the periodicity, or frequency of alternations of current, in a circuit connected to an alternating current generator or source of supply is directly proportional to the speed of said generator, I take advantage of this fact in developing a speed limiting device for rotating shafts, or the rotatable elements of dynamo electric machines.

The object of my invention is therefore to develop a speed limiting device of this character which will be simple and inexpensive and one which will be positive in its action and will eliminate a danger resulting from the derangement of the circuit connections of a rotary converter.

My invention, therefore, consists in one of its aspects of the combination of a dynamo electric machine having a controlling device in the leads or mains connected thereto, and a source of alternating current supply, the frequency of alternations of which depends upon the speed of said dynamo electric machine, and means connected with said alternating current source which is responsive to changes in the frequency of alternations in said source, said last mentioned means controlling the operation of said controlling device.

In another of its aspects my invention comprises the combination of a rotatable member, means for driving said member, means for controlling said driving means, a source of alternating current supply operated by said member, said controlling means being responsive to changes in the frequency of the alternating current of said source in such a manner that the driving means is rendered inoperative when the speed of the rotating member rises above a predetermined value.

The invention further comprises the combination of a rotary converter having direct current mains and alternating current mains connected thereto with a controlling device in the direct current mains, and means responsive to changes in frequency of alternations in the alternating current mains controlling the operation of said circuit-breaker.

The invention will be more clearly understood by referring to the accompanying drawings which illustrate the preferred embodiments of my invention.

In said drawings, Figure 1 represents diagrammatically the circuit connections of a rotary converter equipped with my improved speed limiting device; Fig. 2 represents diagrammatically a slightly modified form of said connections.

Referring now to the drawing, the rotatable element the speed of which is to be limited is illustrated at 3, and in the specific arrangement shown, is the shaft upon which the rotatable element 4 of a rotary converter is mounted. The direct current side of said rotary converter is connected through the commutator 5 to the direct current mains 6 and 7, and the alternating current side of said rotary converter is connected through the collector rings 8, 9, and 10 to the alternating current mains 11, 12, and 13 respectively. Viewing the invention in one of its broadest aspects, the direct current side of the rotary converter constitutes the means for driving the rotatable member 3 and the alternating current side of said rotary converter constitutes a source of alternating current supply driven by said member, the frequency of alternations of current from said source depending upon the speed of said member 3. Located in the direct current mains is a controlling device, here shown as a circuit breaker 14, which may be of any type. The circuit breaker shown comprises the fixed contacts 15 bridged by the movable contact 16, which is prevented by catch 18 from opening under the action of spring 17. This catch is under the control of overload coil 19 and the under-load or no voltage coil 20. The overload coil 19 acts directly upon the core 21, while the under-load coil 20 acts upon the said core 21 through the weighted lever 22, pivoted at 23. The overload coil 19 is connected directly in the mains 6 and 7 and the under-load coil 20 is connected in a shunt circuit 24 across said mains. Located in said shunt circuit 24 is a switch 25, which is under the control of a differentially wound magnet 26, said magnet having the coils 27 and 28, which act normally upon the core 29 in opposition to each other. The two coils 27 and 28 are located in parallel paths or divisions of a divided circuit connected to the alternating current source of supply. They may be connected directly across any pair of the alternating current mains 11, 12, and 13, but are preferably connected as shown in Fig. 1 to special brushes 30 and 31 bearing against the collector rings 8 and 9 respectively on the alternating current side of the rotary converter. To make the differentially wound magnet 26 responsive to changes in frequency of the current from said alternating current source of supply, but more or less independent of the voltage, I connect in circuit with the coil 28 a reactance 32 and in circuit with the coil 27 a non-inductive resistance 33.

Under ordinary conditions of operation, with the frequency remaining practically constant and the voltage varying, the differentially wound magnet 26 will permit the switch 25 to remain in its closed position. If, however, under abnormal conditions, the speed of the rotating member of the rotary converter rises above a predetermined value, the frequency of the alternating current generated in said rotary converter will increase to such an extent that the current through the reactance coil 32 will be greatly retarded, while the current through the non-inductive resistance 33 will not be retarded. The result of this action is that the coil 27 will over-balance the coil 28 and will raise the core 29 against the action of gravity, or against the action of a spring, if a spring is employed, sufficiently to open the switch 25, and either directly open the shunt circuit 24, or insert the relatively high resistance 34 in said circuit. This cuts off or appreciably reduces the flow of current through the under-load coil 20, which in turn permits the weighted lever 22 to drop and trip the circuit breaker. The system as shown is preferably so arranged that if the current strength in the direct current mains rises above a predetermined value, or the voltage falls below a minimum value, the circuit breaker will be opened automatically.

In the modification illustrated in Fig. 2, the core 29 of the differentially wound magnet 26 instead of operating a switch for controlling the circuit breaker, acts directly upon the core 21 to trip the circuit breaker at the predetermined speed.

The invention is capable of various modifications and it is my aim in the appended claims to cover all modifications which do not depart from the spirit of the invention.

Having thus described my invention, what I claim as new and desire to secure by Letters Patent is:—

1. In combination, a dynamo electric machine, a controlling device in the mains of said machine, a source of alternating current, the frequency of alternations of which depends upon the speed of said machine, a circuit connected with said source, and a differentially wound electromagnet supplied from said circuit and having a reactance connected in circuit with part of its winding so that the magnet will be responsive to the changes in frequency of the alternating current of said source, and means for controlling the operation of said controlling device from said magnet.

2. In combination, a rotary converter having direct current mains and alternating current mains connected therewith, a controlling device in the direct current mains and electro-magnetic means including a differentially wound magnet connected with the alternating current side of said converter and responsive to changes in frequency of the current alternations in said alternating current side, said device controlling the operation of said controlling device.

3. In combination, a rotary converter having direct current mains and alternating current mains connected therewith, a controlling device in the direct current mains, a circuit connected to the alternating current side of said converter, a differentially wound magnet in said circuit, a reactance in circuit with part of the magnet winding, and means for controlling the operation of said controlling device from said magnet.

4. In combination, a rotary converter having direct current mains and alternating current mains connected therewith, a controlling device in the direct current mains, a circuit connected to the alternating current side of said converter, a differentially wound magnet controlling said controlling device, and connected in said circuit, a reactance connected in circuit with part of the magnet winding, and a resistance connected in circuit with the remainder of the magnet winding, the whole being so constructed and arranged that said controlling device will be operated when the speed of the converter and hence the frequency of alternations of the alternating current rises above a predetermined value.

5. In combination, a rotatable member, means for driving said member, means for controlling said driving means, a source of alternating current operated by said member, a divided circuit connected to said source, a reactance in one branch of said circuit for changing the current in said branch on a change of frequency, and means responsive to a change of current in said branch for operating the controlling means.

6. In combination, a rotatable member, means for driving said member, a source of alternating current operated by said member, a circuit connected to said source of alternating current, and having two divisions or paths of different inductances, an electromagnetic device comprising two oppositely wound coils located in the respective divisions or paths of said circuit, and means controlled by said magnetic device to render said driving means inoperative when the frequency of alternating current from said source reaches a predetermined value.

7. In combination, a rotary converter having direct and alternating current mains connected thereto, a circuit-breaker in the direct current mains, a circuit connected to the alternating current mains, said circuit having two paths, means in one of said paths or divisions for changing the ratio of currents in said paths on a change of frequency, and means responsive to a change of the ratio of currents in said paths for operating said circuit-breaker.

8. In combination, a rotary converter, having direct and alternating current mains connected thereto, a circuit-breaker in the direct current mains, a circuit connected to the alternating current side of the converter and having two branches of different inductances, and means responsive to a change in the ratio between the currents in said two branches for causing the operation of said circuit-breaker.

9. In combination, a rotary converter, a circuit-breaker in mains connected thereto, two paths for current from the alternating current side of the converter which are so proportioned that the ratio between the currents carried thereby varies when the frequency of the impressed electromotive force varies, and means responsive to a change in the ratio between the currents in said two paths for causing the operation of said circuit-breaker.

10. In combination, a rotary converter, a circuit-breaker in mains connected thereto, a divided circuit connected to the alternating current side of said rotary converter, and electromagnetically operated means controlled by currents in the branches of said circuit for causing the operation of said circuit-breaker when the frequency of the alternating current from said rotary converter rises above a predetermined value.

11. In combination, a rotary converter, a circuit-breaker in mains connected thereto, a divided circuit connected to the alternating current side of said rotary converter, one of the branches of said circuit including a device across which the drop of potential varies when the frequency of the alternating current from the rotary converter varies, said circuit including means responsive to the drop of potential across said device for causing the operation of said circuit-breaker.

12. A frequency-responsive device, comprising a core, two coils connected in parallel paths and acting diametrically oppositely upon said core, an inductive resistance in circuit with said first coil, and an ohmic resistance in circuit with said second coil.

13. A frequency-responsive device, comprising a core, two coils acting diametrically oppositely on said core, and two parallel circuits in which said coils are respectively connected and in which the impedance varies differently upon change of frequency.

14. In combination, an alternating current circuit, two coils supplied from said circuit but located in different branches thereof, a reactance in series with one of said coils, and a core upon which said coils act magnetically in opposite directions.

15. In combination, an alternating current circuit, two coils supplied from said circuit but located in different branches thereof, a reactance in series with one of said coils, a core upon which said coils act magnetically in opposite directions, and a circuit-breaker controlled by said core.

16. In combination, an alternating current circuit, two coils supplied from said circuit but located in different branches thereof, a reactance in series with one of said coils, a core upon which said coils act magnetically in opposite directions, a direct current circuit, and a circuit-breaker in said direct current circuit and controlled by said core.

In testimony whereof I affix my signature, in the presence of two witnesses.

LOUIS C. MARBURG.

Witnesses:
 LAURENT LOWENBERG,
 FRED J. KINSEY.